United States Patent [19]

Inui et al.

[11] Patent Number: 4,679,055

[45] Date of Patent: Jul. 7, 1987

[54] METHOD AND APPARATUS FOR THERMAL HALF-TONE PRINTING

[75] Inventors: Toshiharu Inui; Haruhiko Moriguchi, both of Ebina, Japan

[73] Assignee: Fuji Xerox, Co., Ltd., Tokyo, Japan

[21] Appl. No.: 846,515

[22] Filed: Mar. 31, 1986

Related U.S. Application Data

[63] Continuation of Ser. No. 634,707, Jul. 26, 1984, abandoned.

[30] Foreign Application Priority Data

Jul. 28, 1983 [JP] Japan .................................. 58-138362

[51] Int. Cl.$^4$ .................................................. G01D 15/10
[52] U.S. Cl. ................................... 46/76 PH; 400/120
[58] Field of Search ............... 346/76 PH, 76 R, 1.1, 346/204, 208; 400/120; 214/216 PH, 216 R; 358/296, 298; 350/317.1, 318

[56] References Cited

U.S. PATENT DOCUMENTS 4,071,849  6/1978  Koyano et al. ............... 346/76 PH
4,464,669  8/1984  Sekiya et al. .................. 346/76 PH

FOREIGN PATENT DOCUMENTS 0572772  8/1982  Japan ............................ 346/76 PH Primary Examiner—Arthur G. Evans
Attorney, Agent, or Firm—Spensley Horn Jubas & Lubitz

[57] ABSTRACT

Each picture element is made to correspond to a plurality of dots and the ratios of printing energy corresponding to respective dots in each picture element are determined to correspond to respective tones. The heat accumulation state of a heat generating member corresponding to a picture element to be printed is detected from the tones of picture elements about the picture element to be printed for controlling the printing energy supplied to the heat generating members corresponding to respective dots of the picture image to be printed in accordance with the printing energy ratio and the detected state. With this method it is possible to provide a half tone print having uniform high quality regardless of the tone of a previous line and tones of surrounding picture elements.

8 Claims, 8 Drawing Figures

METHOD AND APPARATUS FOR THERMAL HALF-TONE PRINTING

This is a continuation of U.S. patent application Ser. No. 6,634,707, filed July 26, 1984, now abandoned.

BACKGROUND OF THE INVENTION

1. Field of the Invention

This invention relates to a method and apparatus for thermal half tone printing, and more particularly a method and apparatus for reproducing a picture image having a half tone produced by making each picture element to correspond to a plurality of dots.

2. Description of the Prior Art

Various methods have been proposed for reproducing a picture image of a half tone with a thermal printing system. According to one method, a picture image of a half tone is printed by making one picture element to correspond to a plurality of dots. FIGS. 1 and 2 of the accompanying drawing illustrate this method. In each of FIGS. 1 and 2 one picture element is constituted by four fine picture elements comprising four dots. The method shown in FIG. 1 enable to print a picture image havings tones (1) through (9) by combining four fine picture elements that can assume 3 brightnesses of white, black and gray colors. In FIG. 1, white blocks show white color, hatched blocks show gray color and cross-hatched blocks show black color. In FIG. 2, by using black dots having different diameters, printing of 9 tones of (1) through (9) is made possible.

When printing various tones described above, the printing of gray and black colors and the printing of black dots having different size are accomplished by controlling electric energy supplied to respective heat sensitive members comprising thermal heads utilized to print, for example, by controlling the width of the printing pulse. Actually, however, the brightness or size of the printed dots is influenced by heat accumulation of a heating member caused by the heating of a heating member utilized to print a previous line, or by the heating of heating members utilized to print surrounding picture elements so that it has been often impossible to obtain dots having a desired brightness or size.

For example, where a picture element comprising four dots as shown in FIGS. 3a and 3b is to be printed, it is necessary that the brightnesses of the dots shown by a and b should be equal and the sizes of the dots shown by c and d should be equal. However, due to the influence of the accumulated heat caused by the heat generation utilized to print a previous line the brightness of a dot shown by a becomes lower than that of dot b, and the size of the dot c becomes larger than that of dot d.

Heat is accumulated in each picture element due to the fact that even for the same dot, the heating element thereof is influenced by the tone of the nearby picture elements, that is by the heat generated by the heating elements for printing the picture elements. For this reason, it has been impossible to print patterns, letters, etc. having correct brightness and size.

Such phenomenon makes nonuniform the print of half tone, thus making impossible to print desired half tone.

SUMMARY OF THE INVENTION

It is an object of this invention to provide an improved method and apparatus for thermal half tone printing capable of providing half tone printing having uniform and high quality irrespective of the tone of a previous lines and the tones of surrounding picture elements.

According to one aspect of this invention, there is provided a method of thermal half tone printing wherein each picture element is made to correspond to a plurality of dots and the number of printed dots in the picture element, and the size or brightness of respective printed dots is varied in accordance with a tone of a picture element to be printed so as to represent a half tone picture image, characterized in that the method comprises the steps of presetting printing energy ratios corresponding to respective dots in the picture image in accordance with respective tones, calculating a heat accumulation state of heat generating members corresponding to a picture element in accordance with tones of picture elements about the picture element to be printed and controlling printing energy supplied to heat generating members corresponding to respective dots of the picture element to be printed in accordance with the printing energy ratio and the calculated heat accumulation state.

According to another aspect of this invention, there is provided apparatus for thermal half tone printing wherein each picture element is made to correspond to a plurality of dots and the number of printed dots in the picture element, and the size or brightness of respective printed dots is varied in accordance with a tone of a picture element to be printed so as to represent a half tone picture element, characterized in that the apparatus comprises means for presetting a ratio of printing energy corresponding to respective dots in a picture element in accordance with respective tones, means for calculating a heat accumulation state of heat generating members corresponding to the picture element to be printed in accordance with tones of picture elements about the picture element to be printed, and means for controlling printing energy supplied to the heat generating members corresponding to respective dots of the picture element to be printed in accordance with the ratio of the printing energy and a value calculated by the calculating means.

DESCRIPTION OF THE PREFERRED EMBODIMENT

According to the thermal printing method of this invention, a plurality of (for example, 2048) heat generating elements are arranged on a horizontal line, and current is passed through the resistors in accordance with picture signals so as to print a pattern on a thermal printing sheet disposed close to the resistors. Accordingly the printing head (thermal head) comprises 2048 heat generating elements (heat generating members) arranged on a horizontal line, and a pulse applying circuit which applies to the heat generating elements printing energy corresponding to picture informations.

In this embodiment, the pulse width Tij (i represents the order of the blocks, and j represents the positions 1-4 in a block) to be applied to respective heat generating elements of the thermal head is determined according to the following equations $$Tij = \tau_0 Rij \cdot f(Zi) \qquad (1)$$

$$Zi = g(Xi, Ii) \qquad (2)$$

where $\tau_0$ = constant (sec.)

In these equations Rij represents a pulse width ratio corresponding to the tone of a picture element for each picture elements Ei comprising fine (minute) picture elements 1-4; so that the pulse width Tij to be applied can be determined by predetermining Rij, and multiplying the same with a state coefficient f(zi) calculated from an information Zi representing the heat accumulating state of the picture elements about a given picture element Ei. The information Zi representing the heat accumulation states of the picture elements about the picture element Ei is calculated based on a heat hysteresis information Xi, and an interval time information Ii representing a scanning period of each block, that is a two line scanning period. For the sake of brevity, it is herein assumed that the processing speeds of lines are equal and that the interval time information Ii is not considered.

Figure 1:
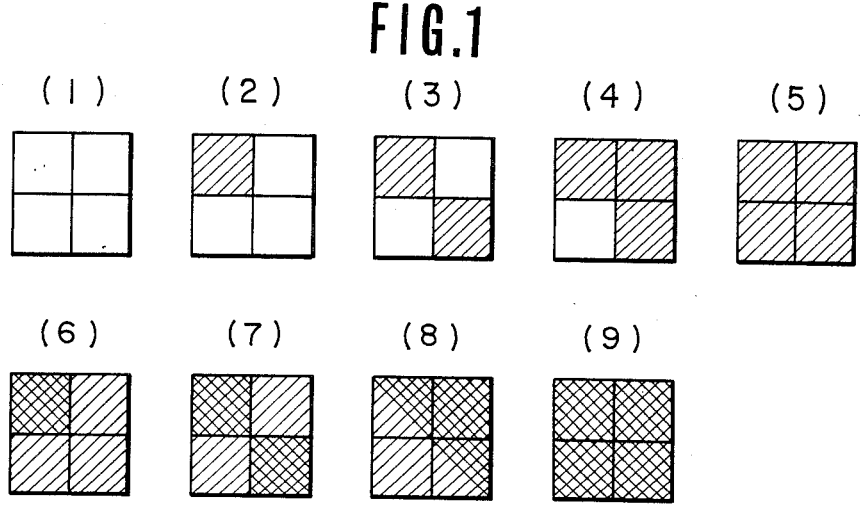
FIGS. 1 and 2 show states of dots where a half tone picture image is represented by nine tones.
Figure 2:
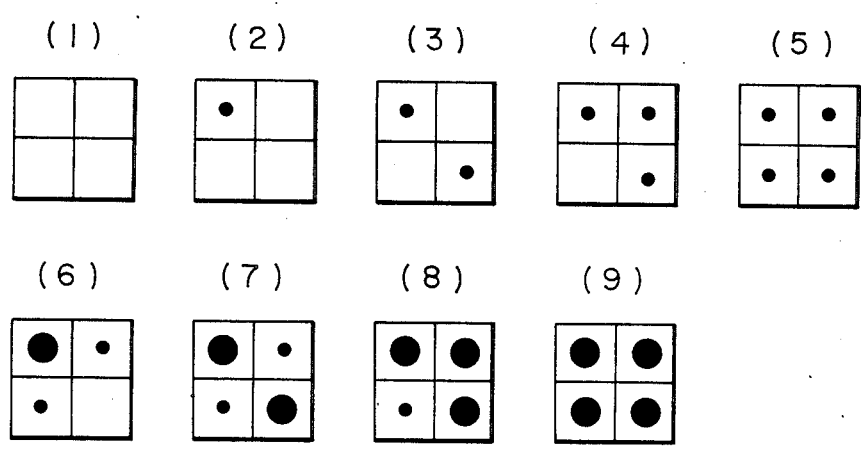
Figure 3:
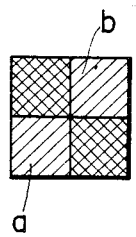
FIGS. 3A and 3B shows diagrams showing examples of printing dots.
Figure 3:
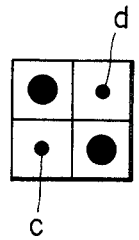

At first, the pulse width ratio Rij will be described. This means that 9 tones shown by (1)-(9) in FIG. 1 are represented by four fine picture elements $Ri_1$, $Ri_2$, $Ri_3$ and $Ri_4$, but for representing ideal 9 tones (1)-(9) thermal correction is made by taking into consideration mutual thermal influence among four heat generating elements corresponding to respective fine picture elements. More particularly, when representing 2×2=4 dots, the pulse width ratio will be as shown in the following Table I. Thus, in the cases of (1)-(5), respective dots $Ri_1$-$Ri_4$ are represented by half tones. In these cases, as the amount of heat accumulation is small, it is not necessary to make heat accumulation correction, while in the cases of (6)-(9), the correction is made. The pulse width for reproducing a half tone dot is made to be 0.7 where the pulse width for reproducing an ordinary dot is made to be 1.

TABLE 1

|       | (1) | (2) | (3) | (4) | (5) | (6) | (7) | (8) | (9) |
|-------|-----|-----|-----|-----|-----|-----|-----|-----|-----|
| $Ri_1$ | 0   | 0   | 0   | 0   | 0.7 | 0.7 | 0.7 | 0.9 | 0.9 |
| $Ri_2$ | 0   | 0.7 | 0.7 | 0.7 | 0.7 | 1   | 1   | 0.9 | 0.9 |
| $Ri_3$ | 0   | 0   | 0.7 | 0.7 | 0.7 | 0.6 | 0.5 | 0.5 | 0.8 |
| $Ri_4$ | 0   | 0   | 0   | 0.7 | 0.7 | 0.7 | 1   | 0.8 | 0.8 |

The thermal hysteresis information Xi will now be described.

Figure 4:
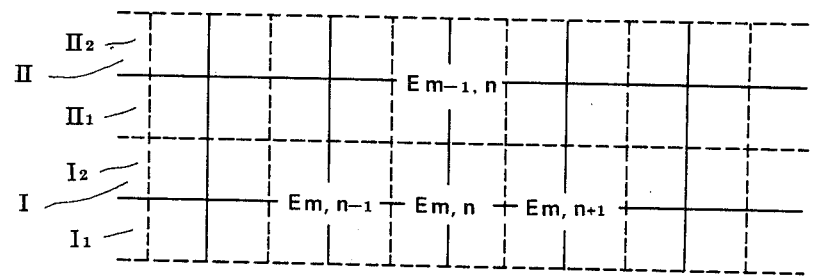
FIG. 4 is a graph showing the arrangement of printed picture elements.

FIG. 4 shows an arrangement of a printed picture element (an assembly of four fine picture elements $Ri_1$, $Ri_2$, $Ri_3$ and $Ri_4$) in which a line block I represents a line block now being printed and line block II represents a previous (preceding two lines) line block.

According to the method of this invention, the heat accumulation state corresponding to a picture element Emn is determined in accordance with a combination of the states of the dots of picture elements $Em-1,n$, $Em,n-1$, $Emn+1$ that is the degree of tone. $Em,n-1$ and $Em,n+1$ belong to the same line block as the picture element E. The picture elements $Em,n-1$ and $Em,n+1$ are located on both sides of the picture element Emn. The picture element $Em-1,n$ corresponds to the line element Emn on the line block previously printed.

Figure 5:
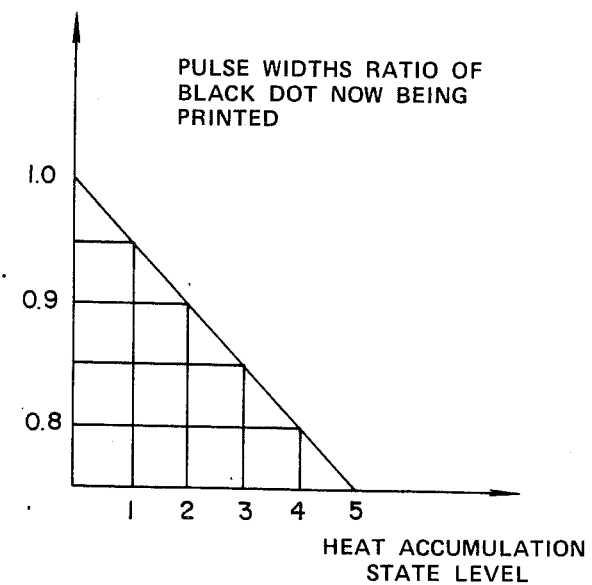
FIG. 5 is a graph showing the relationship between the heat accumulation state level and the state coefficient.

As shown in the following Table II, the heat accumulation state is represented by six heat accumulation state levels 0-5 in accordance with the states of respective dots in respective peripheral picture elements $Em,n-1$, $Em,n+1$ and $Em-1,n$. The state coefficient f(Zi) is determined as a function of the heat accumulation level, as shown in FIG. 5, in which the abscissa represents the heat accumulation state level, while the ordinate represents the state coefficient f(Zi). Thus, under the present heat accumulation state, the state coefficient shows the value of the present printing pulse width converted to the black dot.

In this manner, the pulse width $\tau$ to be applied for each dot is obtained by multiplying a reference pulse width $\tau_0$ with the pulse width ratio and the state coefficient.

TABLE II

| picture element No. | state of picture element |
|---|---|
| $Em,n-1$ | (1) (1) ... (2) (3) ... (7) ... (9) |
| $Em,n+1$ | (1) (2) ... (3) (3) ... (6) ... (9) |
| $Em-1,n$ | (1) (1) ... (3) (3) ... (3) ... (9) |
| heat accumulation state level | 0 ... 1 ... 3 ... 5 |

Figure 6:
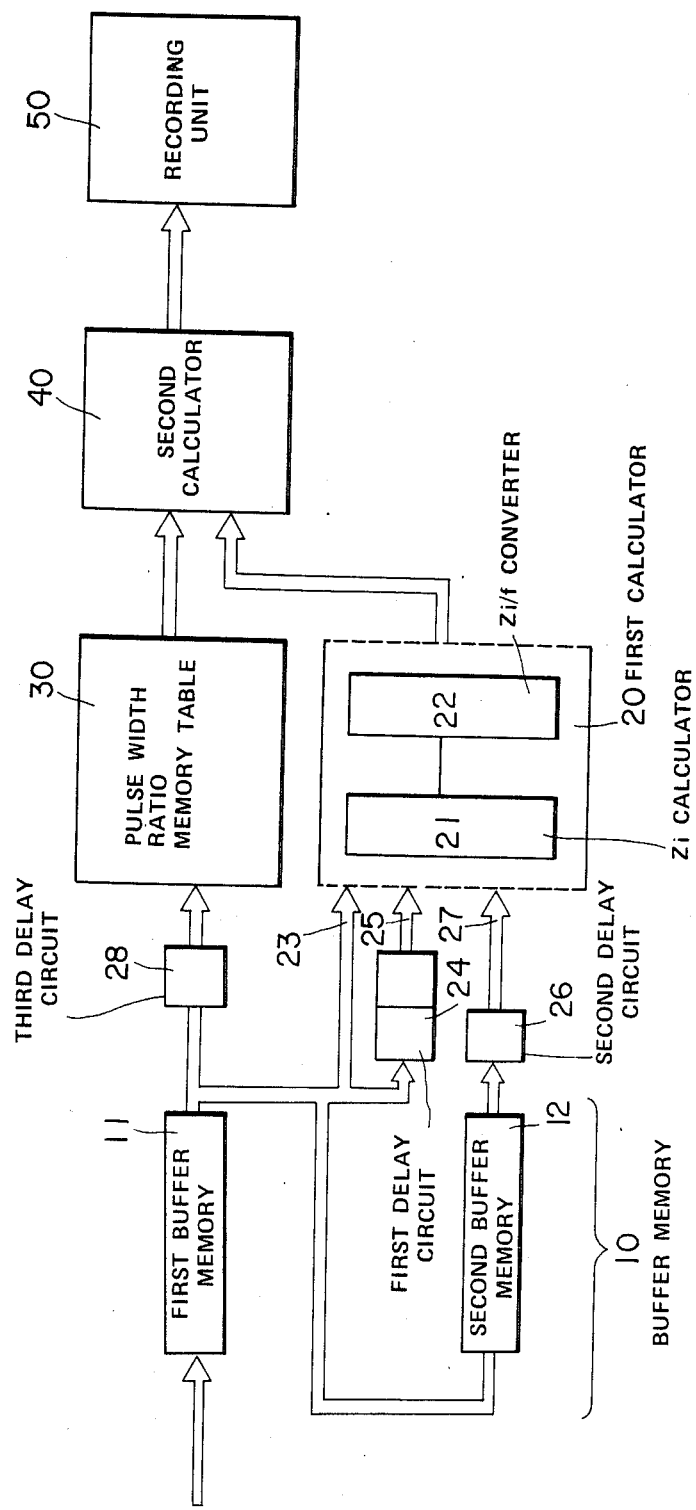
FIG. 6 is a block diagram showing a pulse applying circuit.

As shown in FIG. 6, the pulse applying circuit is constituted by an information buffer memory device 10 for storing picture informations, a first calculator 20 for calculating heat accumulation state caused by peripheral heat generating elements based on the information of each picture element, a pulse width ratio memory table 30 storing the pulse width ratio adapted to predetermine the width of the pulse applied to respective dots in one picture element for the purpose of reproducing 9 tones, and a second calculator 40 for determining the pulse width applied to respective heat generating elements in accordance with the pulse width ratio outputted from the pulse width ratio memory table and the output from the first calculator 20.

The information buffer memory device 10 is constructed to store line informations at every two lines with 9 tones and comprises first and second buffer memory devices 11 and 12 each having memory areas corresponding to the total number of picture elements of the thermal head, the second buffer memory device 12 sequentially storing the output of the first buffer memory device 11. The first buffer memory device 11 stores picture informations corresponding to two lines $I_1$ and $I_2$ to be presently printed, while the second buffer memory device stores picture informations corresponding to two lines $II_1$ and $II_2$ printed previously.

The first calculator 20 comprises a Zi calculator 21 calculating the heat accumulation state level Zi in accordance with the degrees of tones of picture elements $Em-1,n$, $Em,n-1$, and $Em,n+1$ about a given picture element Emn, and a Zi/f converter 22 that converts the heat accumulation state level Zi into a state coefficient f. The first calculator 21 is provided with a first input port 23 connected to the output of the first buffer memory device 11, a second input port converted to the output of the first buffer memory device 11 via a first delay circuit 24, and a third input port connected to the output of the second buffer memory device 12 via a second delay circuit. The first delay circuit 24 delays an input signal by 2 bits, while the second delay circuit 26 delays an input signal by 1 bit.

The pulse ratio memory table 30 stores 9 types of pulse ratios predetermined by applying a thermal correction in a picture element for the purpose of reproducing 9 tones shown in Table I, and is constructed to output a pulse ratio of a degree of tone based on a corresponding picture element outputted from the first buffer memory device 11 via a third delay circuit 28 which delays an input by one picture element. Thus, for example, when the output from the first buffer memory device 11 is $E_{m,n+1}$, the third delay circuit 28 outputs $E_{m,n}$.

The second calculator 40 is constructed to multiply a unit time $\tau_0$ with a state coefficient outputted from the Zi/f converter 22, and then multiply a product thus obtained with a pulse ratio corresponding to each dot outputted from the pulse ratio memory table 30 so as to produce a pulse having a width applied to each heat generating element.

The method of producing a half tone print by using the pulse applying circuit will now be described.

A picture information received by a facsimile receiver, for example, is once stored in an information buffer memory device, not shown, and then sequentially stored in the first and second buffer memory devices 11 and 12 as a half tone picture image corresponding to either one of 9 types of the degrees of tones, for each line block (that is for 2 lines).

Where the outputs from the first buffer memory device 11 corresponds to the picture element $E_{m,n+1}$, this picture element is stored in the pulse width memory table 30 as a picture element $E_{m,n}$ which has been delayed by one picture element by the third delay circuit 28.

At this time, to the first input port of the Zi calculator 21 is inputted a picture element $E_{m,n+1}$ just to the right of the picture element $E_{mn}$, while to the second input port 25 is inputted a picture element $E_{m,n-1}$ to the left of the picture element $E_{mn}$, the picture element $E_{m,n-1}$ corresponding to that two picture element before. To the third input port 25 is inputted an information representing the tone of a picture element $E_{m-1,n}$ of the previous line corresponding to the picture element $E_{m,n}$.

As above described, the Zi calculator 21 extracts picture elements $E_{m,n-1}$ and $E_{m,n+1}$ on both sides of the picture element $E_{mn}$ in a line block m now being printed and an adjacent picture element $E_{m-1,n}$ in the line block $m-1$ previously printed respectively from the first and second buffer memory devices 11 and 12 for calculating the heat accumulation state level.

The heat accumulation state level thus calculated is converted into a state coefficient f by the Zi/f converter 22 and then inputted into the second calculator 40.

In accordance with a picture information (having 9 types of the degrees of tones) outputted from the first buffer memory device 11 and corresponding to a picture element in a line block m now being printed, the pulse ratio memory table 30 sequentially outputs pulse ratios of picture elements $E_{m1}, E_{m2}, E_{m3}... E_{mn}$. In this manner, four pulse ratios $R_{11}, R_{12}, R_{13}$ and $R_{14}$ are sequentially applied to the other input terminal of the second calculator 40 at each picture element.

The second calculator 40 calculates the two inputs for determining the pulse width $T_{ij}$ to be applied to each fine picture element. Thus, the second calculator 40 sequentially supplies to a printing unit 50 picture informations $T_{11}, T_{12}, T_{13}, T_{14}, T_{21}, T_{22}...$ of one line block that is of two lines.

In the printing unit 50, the picture informations of two lines outputted as above described are divided into individual lines so as to apply pulses of predetermined widths to respective heat generating elements. For this reason, it becomes possible to obtain a half tone picture image of uniform quality.

Although in the foregoing embodiment, at the time of calculating the heat accumulation level, calculation was made without adding a weight corresponding to the degree of influence to a given picture element, when a weight is added the quality of the picture can further be improved. It is also possible to widen the range of the nearby picture elements that should be considered for the purpose of improving the quality of the picture image.

Figure 7:
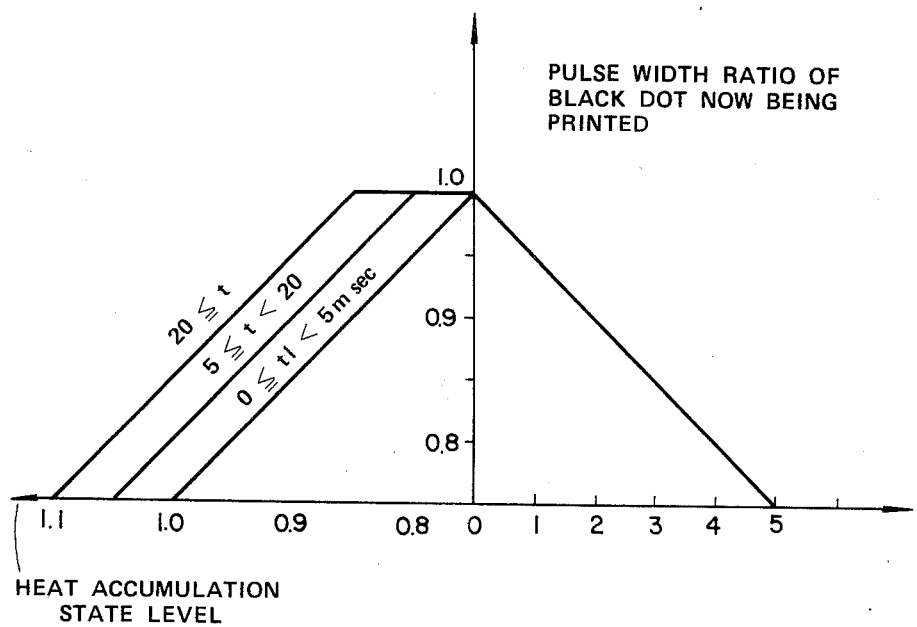
FIG. 7 is a graph showing the relationship between the heat accumulation state level and the state coefficient.

Although in the foregoing description the interval time information Ii was not taken into consideration, in the case of a printer or facsimile, since the period in which data are sent is random, it is advantageous to apply a time correction. For example, as shown in FIG. 7 a method has been proposed in which the state coefficient f is corrected in accordance with the length of the data waiting time $\tau$. In this manner, when the pulse length is increased to 0.05 ms or 0.1 ms, even when the data waiting time is long, it is possible to correct decrease of the size of the printed dot or decrease in the brightness thereof caused by cooling of the heat generating elements.

Furthermore, although in the foregoing embodiment, the energy supplied to the heat generating elements was adjusted by varying the pulse width, it should be understood that the invention is not limited to such method and that the energy can be varied by adjusting the voltage level supplied to the heat generating elements.

It should also be understood that the invention is not limited to the thermal printing system, and that the invention is applicable to a transfer type thermal printing system and to various other systems utilizing a thermal head.

What is claimed is:

1. A method of thermal half tone printing of picture elements in lines wherein each picture element is made up of a plurality of dots, and the number of printed dots in said picture element and the size or brightness of respective printed dots are varied in accordance with a tone of a picture element to be printed so as to represent a half tone image, the method comprising the steps of:

determining printing energy ratios between respective dots in said picture element in accordance with respective tones;

calculating a heat accumulation state of the heat generating members corresponding to a picture element to be printed in accordance with at least the tones of picture element in the neighborhood of and in the same lines as said pictue element to be printed, and controlling the printing energy supplied to said heat generating members corresponding to respective dots of said picture element to be printed in accordance with both said printing energy ratio and said calculated heat accumulation state.

2. The method according to claim 1 wherein said printing energy is controlled by individually varying the widths of pulses applied to the heat generating members corresponding to respective dots in said picture element.

3. The method according to claim 1 wherein said printing energy is controlled by varying an interval of applying said pulses to said heat generating members corresponding to respective dots.

4. The method according to claim 1 wherein said printing energy is controlled by varying a voltage level of pulses applied to heat generating members corresponding to said dots.

5. The method according to claim 1 wherein said calculation of said heat accumulation state of the heat generating members corresponding to a picture element to be printed includes a weighting factor corresponding to an influence upon said picture element from picture elements in the neighborhood of said picture element.

6. The method according to claim 1 wherein said calculation of said heat accumulation state of a heat generating member corresponding to a picture element to be printed is made by correcting a time corresponding to a receiving period of a waiting time of a picture signal.

7. Apparatus for thermal half tone printing of picture elements in lines wherein each picture element is made up of a plurality of dots and the number of printed dots in said picture element, and the size or brightness of respective printed dots, is varied in accordance with a tone of picture element to be printed so as to represent a half tone picture element, the apparatus comprising:

means for determining a ratio of printing energy between respective dots in a picture element in accordance with respective tones;

means for calculating a heat accumulation state of heat generating members corresponding to said picture element to be printed in accordance with at least the tones of picture elements in the neighborhood of and in the same lines as said picture element to be printed; and means for controlling the printing energy supplied to said heat generating members corresponding to respective dots of said picture element to be printed in accordance with both said ratio of said printing energy and a value calculated by said calculating means.

8. A method of thermal half tone printing wherein each picture element is made up of a plurality of dots, and the number of printed dots in said picture element and the size or brightness of respective printed dots are varied in accordance with a gradation of a picture element to be printed so as to represent a half tone image, the method comprising the steps of:

determining in advance the printing energy ratios between respective dots in said picture element in accordance with respective gradations;

calculating a heat accumulation state of an individual picture element to be printed based on past and present tonal information of said picture element and its adjacent neighbors during the present print cycle, and said picture element's tonal information from the previous print cycle, and controlling the printing energy supplied to heat generating members corresponding to respective dots of said picture element to be printed in accordance with said printing energy ratio and said calculated heat accummulation state.

* * * * *